United States Patent [19]

Satoh et al.

[11] Patent Number: 5,471,289
[45] Date of Patent: Nov. 28, 1995

[54] FIXING DEVICE HAVING A SKEW COMPENSATION CAPABILITY

[75] Inventors: Minoru Satoh; Kazuhito Nakamura, both of Niigata, Japan

[73] Assignee: NEC Corporation, Tokyo, Japan

[21] Appl. No.: 302,082

[22] Filed: Sep. 7, 1994

Related U.S. Application Data

[63] Continuation of Ser. No. 67,625, May 28, 1993, abandoned.

[30] Foreign Application Priority Data

Jun. 16, 1992 [JP] Japan .................... 4-156631

[51] Int. Cl.⁶ .................................................. G03G 15/20
[52] U.S. Cl. ...................... 355/290; 198/806; 219/216
[58] Field of Search .................................. 355/282, 285, 355/289, 290; 219/216; 198/806, 807; 474/102, 106, 107, 108

[56] References Cited

U.S. PATENT DOCUMENTS

| | | | |
|---|---|---|---|
| 3,973,446 | 8/1976 | Vasilantone | 198/806 X |
| 3,993,186 | 11/1976 | Sokolowski | 198/806 |
| 5,027,160 | 6/1991 | Okada et al. | 355/282 |
| 5,091,752 | 2/1992 | Okada | 355/285 |
| 5,119,143 | 6/1992 | Shimura | 355/289 |
| 5,153,655 | 10/1992 | Suzuki et al. | 355/285 |
| 5,157,444 | 10/1992 | Mori et al. | 355/282 |

FOREIGN PATENT DOCUMENTS

| | | | |
|---|---|---|---|
| 0095016 | 6/1983 | Japan | 198/806 |
| 0157883 | 6/1990 | Japan | 355/290 |
| 0266381 | 10/1990 | Japan | 355/285 |
| 0025473 | 2/1991 | Japan | 355/290 |

OTHER PUBLICATIONS

Kimura et al., "New fixing system 'SURF' can reduce the warm–up time", Japan Hardcopy '90 Documents of The Annual Conference on Japan Hardcopy for the Society of Electrophotography of Japan, Jun. 20–22, 1990, pp. 53–56.

Primary Examiner—Robert Beatty
Attorney, Agent, or Firm—Sughrue, Mion, Zinn, Macpeak & Seas

[57] ABSTRACT

A fixing device incorporated in an image recording apparatus has a heater 24 for fixing an image formed on a sheet 11 by heating a toner 12 constituting the image, and a thin endless belt 21 for carrying the sheet 11. The endless belt 21 is rotated by a drive roller 22 and is given tension by a tension roller 23. A tapered member 26a is located at an end of the tension roller 23 and a guide member 30 contacts with a side tapered surface of the tapered member. When the endless belt 21 skews, the tension roller 23 moves along its axis by a reaction force and inclines in a direction parallel to a tension direction of the tension roller 23 to compensate for the skew.

10 Claims, 3 Drawing Sheets

FIXING DEVICE HAVING A SKEW COMPENSATION CAPABILITY

This is a Continuation of application Ser. No. 08/067,625 filed May 28, 1993 now abandoned.

BACKGROUND OF THE INVENTION

1. Field of the Invention

The present invention relates to a fixing device for an image recording apparatus and, more particularly, to a fixing device incorporated in an image recording apparatus, such as a printer or a copying machine, for fixing an image formed on a sheet by heating a toner constituting the image while rotating an endless belt.

2. Description of the Related Art

Recently, a fixing device, which can reduce a warm-up time, has been developed. The fixing device is described by Kimura et al. in a publication entitled "New fixing system 'SURF' can reduce the warm-up time", Japan Hardcopy '90 Documents of The Annual Conference of Japan Hardcopy for the Society of Electrophotography of Japan, pp. 53 to 56, Jun. 20–22, 1990. The fixing device of Kimura et al. includes a heater unit having a heating register line, and a thin endless belt. The thin endless belt is given tension by a drive roller, a tension roller and the heater unit, and it is rotated by the drive roller to carry a paper which is charged with toner constituting an image. While the paper is carried by the thin endless belt, it is pressed to the heater unit via the thin endless belt by a pressure roller so that the toner can be fixed on the paper by heat. However, because of the size or position fault of the two rollers and the imbalance of the tension to the tension roller and the heater unit, the thin endless belt skews.

To prevent the skew, an adjustment mechanism, for adjusting the position of the thin endless belt, is mounted in the fixing device. The conventional adjustment mechanism has a photosensor located at the side of the thin endless belt for detecting the skew, a solenoid operative in response to the photosensor, and a mechanical device connected to the solenoid for lifting or lowering one end of the tension roller. When the photosensor detects the skew of the thin endless belt, the solenoid activates the mechanical device to lift or lower the one end of the tension roller. The lifting or lowering directions are perpendicular to the tension direction of the tension roller. This mechanism is described in detail later.

However, the lifted or lowered tension roller imparts a strong tension to the thin endless belt because the belt gets twisted by lifting or lowering the one end of the tension roller, and this causes the belt to wear out prematurely. Moreover, since the photosensor and the solenoid are expensive, the above fixing device is not economical.

SUMMARY OF THE INVENTION

The object of the present invention is to provide a fixing device which does not impart a strong tension to a thin endless belt and which is economical.

A fixing device according to the present invention, has an endless belt, a driver for rotating the endless belt, a heater, which contacts with an inner surface of the endless belt, for supplying heat to the toner formed on the sheet via the endless belt, a tension roller, which contacts with the inner surface of the endless belt, for imparting a predetermined tension to the endless belt, and a device for inclining the tension roller in a direction parallel to a tension direction of the predetermined tension.

A preferred embodiment of the device for inclining is a tapered member coupled to one end of the tension roller, and a guide member which contacts with a tapered side surface of the tapered member.

DETAILED DESCRIPTION OF THE PREFERRED EMBODIMENTS

Before describing the preferred embodiments of the present invention, a conventional structure of a fixing device will be described to help in understanding the present invention.

Figure 1:
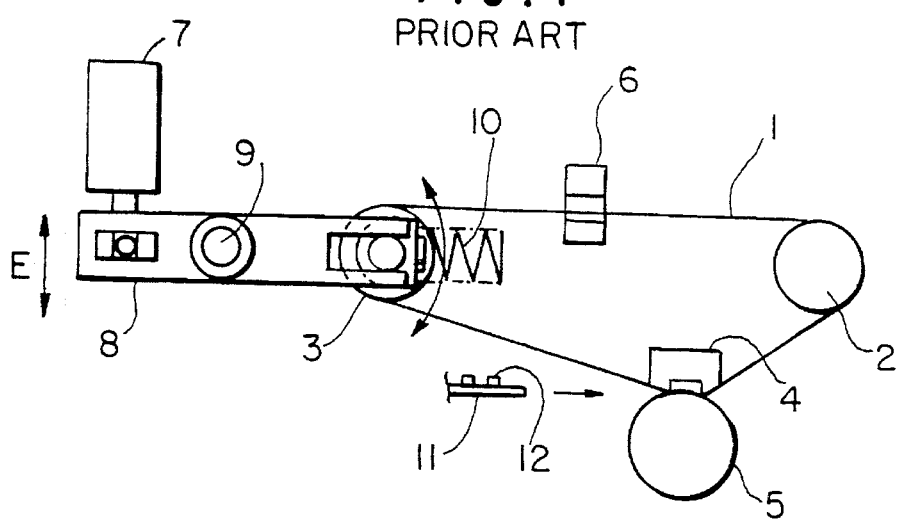
FIG. 1 is a side view of a conventional fixing device for an image recording apparatus.

FIG. 1 is a side view of a conventional fixing device which reduces a warm-up time. The conventional fixing device fixes an image formed on a sheet 11 by heating a toner 12 constituting the image on the sheet while rotating a thin endless belt 1. The thin endless belt 1 rotates around a drive roller 2, a tension roller 3 and a heater 4 having a heating resister therein. The heating resister is positioned close to the endless belt 1. The drive roller 2 drives the endless belt 1, and the tension roller 3 imparts a predetermined tension to the belt 1. The tension is generated by a tension spring 10. A pressure roller 5 imparts a pressure to the heater 4 while the endless belt 1 guides the sheet 11 between the heater 4 and the pressure roller 5. Therefore, the toner 12 on the sheet 11 is fixed by the heat emitted from the heater 4 via the endless belt 1.

Figure 2A:
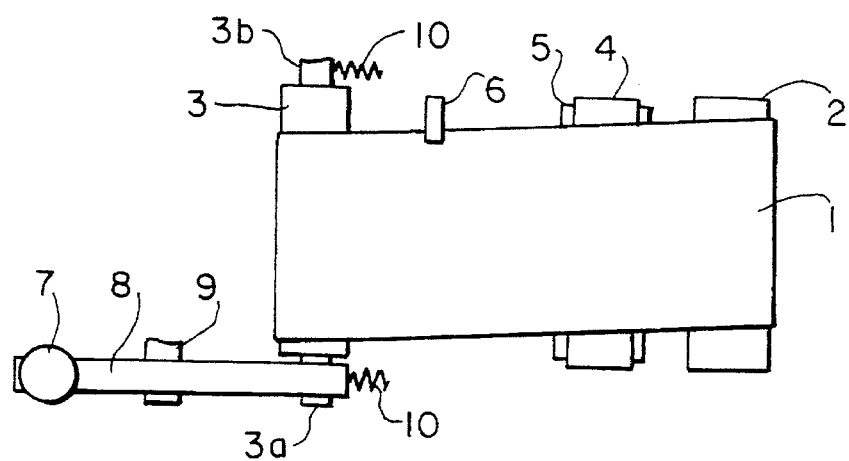
FIGS. 2A and 2B are plan views of the conventional fixing device in the skewing condition.
Figure 2B:
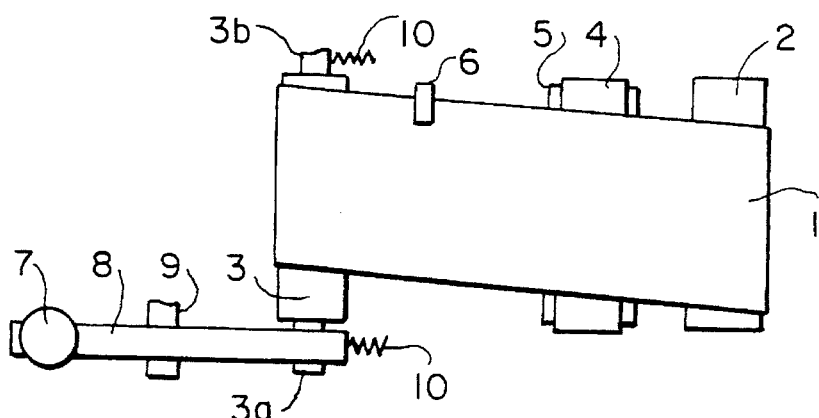

A photosensor 6, a solenoid 7 and a link lever 8 form a skew compensation device for compensating the skew of the endless belt 1. FIGS. 2A and 2B are plan views of the conventional fixing device in the skewing condition of the endless belt 1. The photosensor 6 is located on the side of the endless belt 1. The link lever 8 rotates around the axis 9 and one end of the link lever 8 is connected to an end portion 3a of the tension roller 3 and an opposite end of the link lever 8 is connected to the solenoid 7. If the endless belt 1 moves to the direction of the end portion 3a due to the skew as shown in FIG. 2A, an output of the photosensor 6 increases and then the solenoid 7 drops or lowers the link lever 8 in the direction perpendicular to the tension by the tension spring 10 to lift the end portion 3a. Thus, the endless belt 1 disposed over the tension roller 3 moves to the direction of the other end portion 3b. Oppositely, if the endless belt 1 moves to the end portion 3b due to the skew as shown in FIG. 2B, the output of the photosensor 6 decreases and then the solenoid 7 lifts the link lever 8 to drop or lower the end portion 3a. Thus, the endless belt 1 disposed over the tension roller 3 moves to the portion 3a.

However, when the end portion 3a lifts or drops, the endless belt 1 twists and a tension of the endless belt 1 increases dramatically. Thus, the endless belt 1 wears out prematurely. Moreover, since the photosensor 6 and solenoid 7 are expensive, the conventional fixing device is not economical.

Figure 3A:
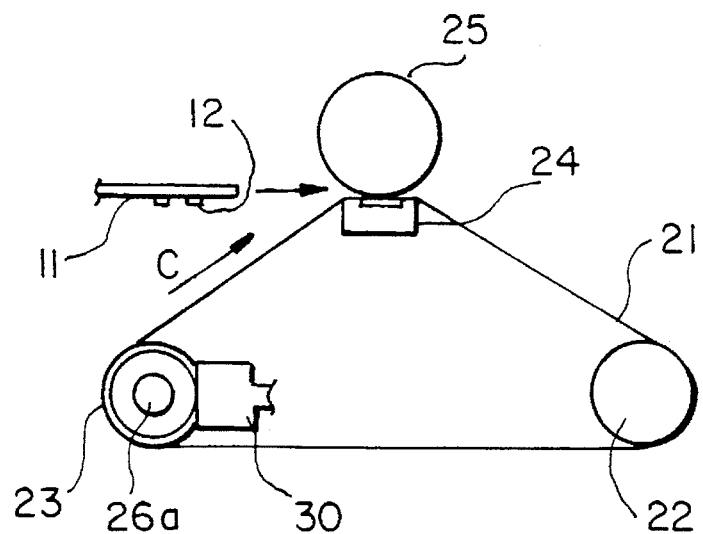
FIG. 3A is a schematic side view of a fixing device according to a preferred embodiment of the present invention.
Figure 3B:
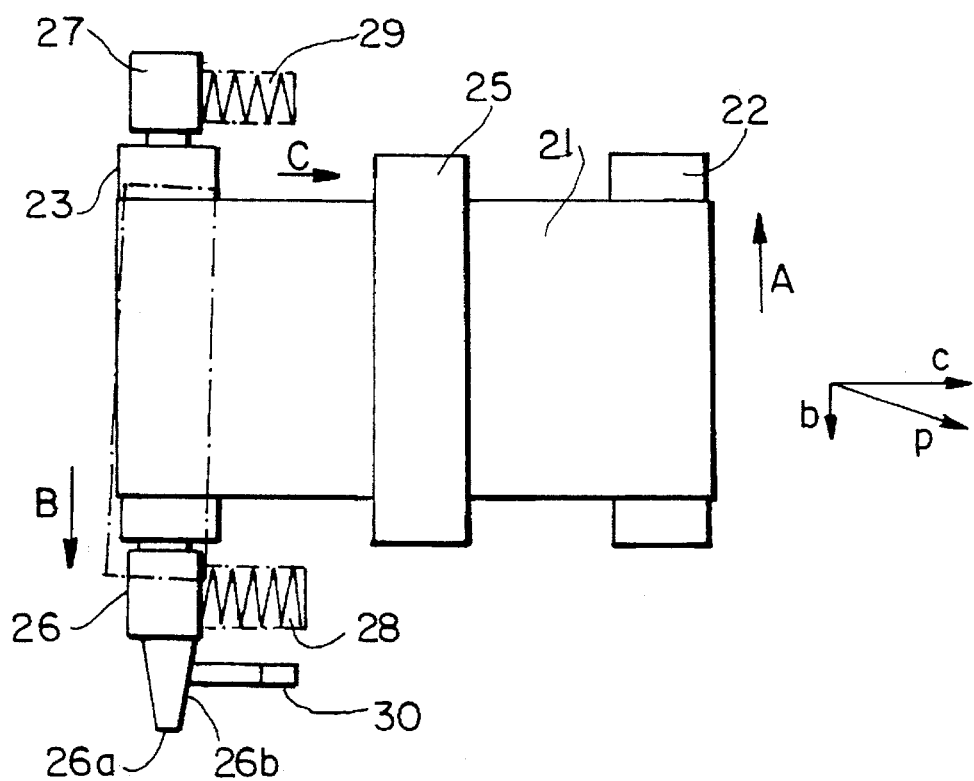
FIG. 3B is a plan view of the fixing device in FIG. 3A.

FIG. 3A is a schematic side view of a fixing device according to a preferred embodiment of the present invention, and FIG. 3B is a plan view of the fixing device of FIG. 3A.

In FIGS. 3A and 3B, a thin endless belt 21, drive means comprising a driving roller 22, heating means comprising a heater 24, and a pressure roller 25 are respectively similar to the associated members which are given the reference numbers 1, 2, 4 and 5 in FIG. 1. The toner 12 formed on the sheet 11 is heated by the heater 24 to fix the toner 12 while the sheet 11 is passed between the heating unit 24 and the pressure roller 25 by the thin endless belt 21. A tension roller 23 is provided with bearings 26 and 27 at opposite ends thereof. The bearings 26 and 27 are each constantly biased by tension springs 28 and 29 to give a predetermined tension to the endless belt 21. The fixing device further includes inclining means comprising a tapered member 26a and a guide member 30. The tapered member 26a is coupled to one end of the tension roller 23. The tapered member 26a extends out from the outer end of the bearing 26. The diameter of the tapered member 26a gradually decreases to the end thereof. The guide member 30 is held in contact with a tapered side surface 26b of the tapered member 26a. One end of the guide member 30 is fixed to a body (not shown) of the fixing device.

In the above fixing device, when the endless belt 21 is moved in a direction indicated by an arrow C, it skews in one direction (e.g., direction A) due to a difference in parallelism between the drive roller 22 and the tension roller 23 or a difference in the tensions of the tension springs 28 and 29. As a result, a reaction acts on the tension roller 23 in the opposite direction B, causing the tension roller 23 to move in the direction B by sliding in the bearings 26 and 27. Consequently, the position where the tapered member 26a contacts the guide member 30 changes, that is, the position moves closer to the bearing 26. This causes the tension roller 23 to incline to a position indicated by a dash-and-dot line in FIG. 3B. In this situation, the spring 28 is expanded and the spring 29 is contracted. In this case, the endless belt 21 intends to run in a direction P. A force having the direction P is divided into forces of the directions b and c. The force of the direction b is the force which cancels the force of the skewing direction A. Therefore, the running direction of the endless belt 21 is corrected to the direction C.

When the endless belt 21 skews in a direction opposite to A (see FIG. 3B), the tension roller 23 inclines in the opposite direction to correct the skew in the other direction.

In this embodiment, since the tension roller 23 inclines in a direction parallel to the tension direction of the tension springs 28 and 29, the endless belt 21 does not get twisted. Moreover, since there is no sensor or solenoid, it is economical.

Figure 4:
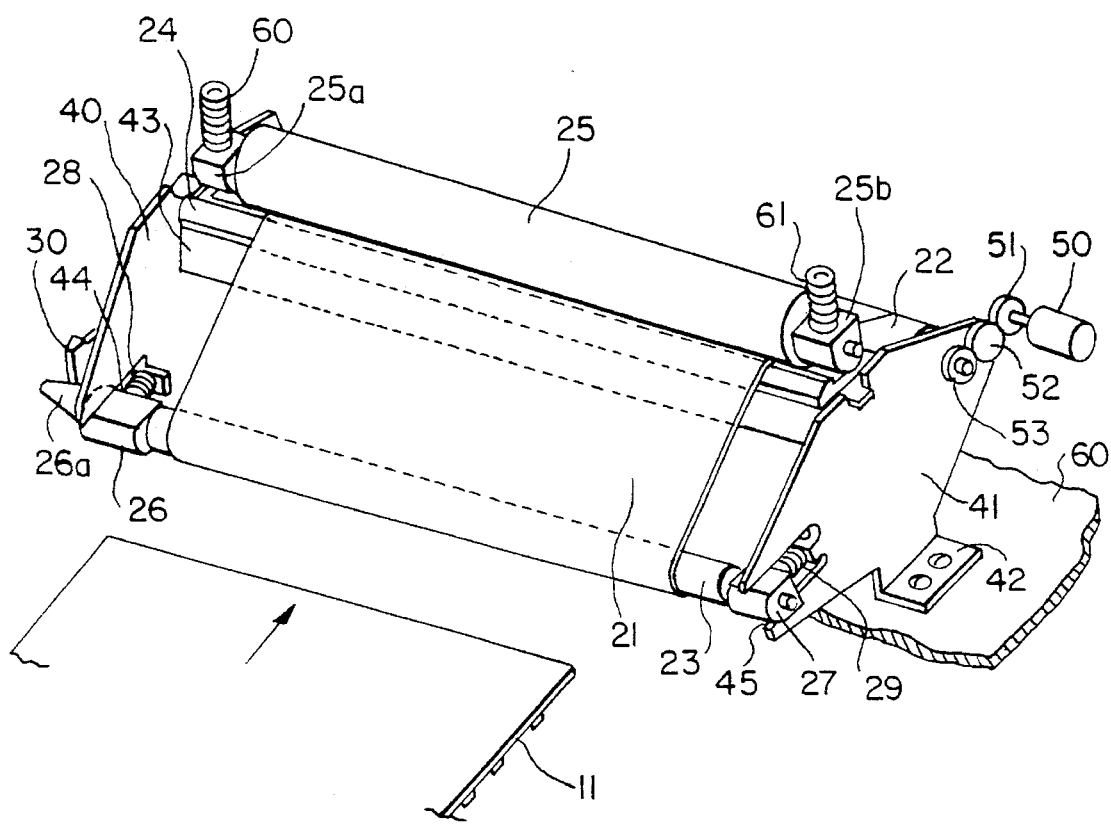
FIG. 4 is a perspective view of the fixing device according to the second embodiment of the present invention.

FIG. 4 is a perspective view of a second embodiment of the present invention. The fundamental structures and functions of the second embodiment is similar to the fixing device in FIGS. 3A and 3B. Only the position of the bearings 26 and 27 is opposite to that of the same bearings in FIG. 3B. In FIG. 4, the drive roller 22, tension roller 23 and heater 24 are held between holders 40 and 41, and each holder is fixed to a body 60 of a printing machine via a flange 42. A motor 50 drives the drive roller 22 via a gear 51, gear 52 and gear 53 to rotate the thin endless belt 21. The heater 24 is fixed on a support member 43, and the pressure roller 25 imparts a pressure to the heater 24 via the endless belt 21 by the springs 60 and 61. The springs 60 and 61 impart the pressure to bearings 25a and 25b of the pressure roller 25. The bearings 26 and 27 of the tension roller 23 are respectively held in gaps 44 and 45 of the holders 40 and 41, and the bearings can slide in the gaps 44 and 45. The tension springs 28 and 29 are located in the gaps 44 and 45, and opposite ends of the tension springs 28 and 29 are respectively fixed to the bearings 26, 27 and the holders 40, 41 respectively to impart a predetermined tension to the endless belt 21. The guide 30 is fixed to the holder 41. The operation for compensating a skew of the endless belt 21 is similar to that of the fixing device in FIG. 3B.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A fixing device incorporated in an image recording apparatus for fixing an image formed on a sheet by heating a toner constituting the image, comprising:

an endless belt having an inner and an outer surface;

drive means for rotating said endless belt;

heating means, which contacts with the inner surface of said endless belt, for supplying heat to a toner image formed on a sheet via said endless belt;

a tension roller mounted for rotation about an axis and which contacts with the inner surface of said endless belt, said tension roller imparting a predetermined tension to said endless belt in a tension direction and being movable axially along said axis of said tension roller;

a tapered member, which has a tapered side surface, coupled to one end of said tension roller; and a guide member which contacts with said tapered side surface of said tapered member and is fixed on said fixing device;

said tension roller being moved along said axis by a skew of said endless belt, and the movement along said axis causing a contacting position between said tapered side surface and said guide member to be changed to incline said tension roller along said tapered side surface for canceling the skew.

2. The fixing device claimed in claim 1, wherein said tension roller has bearings at opposite ends thereof, and said tapered member is located at one of said bearings.

3. The fixing device claimed in claim 2, wherein said drive means comprises a drive roller which contacts with the inner surface of the endless belt.

4. The fixing device claimed in claim 3, further comprising a pair of holders for holding said drive roller, said heating means and said bearings of said tension roller; and tension springs, which push said bearings, for imparting the predetermined tension to said endless belt, said holders including gaps for slidably holding said bearings therein.

5. The fixing device claimed in claim 1, wherein said heating means comprises a heater which contacts with said endless belt, and a pressure roller for pressing said heater via said endless belt.

6. A fixing device incorporated in an image recording apparatus for fixing an image formed on a sheet by heating a toner constituting the image, comprising:

an endless belt having an inner and an outer surface;

drive means for rotating said endless belt;

heating means, which contacts with the inner surface of said endless belt, for supplying heat to a toner image formed on a sheet via said endless belt;

a tension roller, which contacts with the inner surface of said endless belt, for imparting a predetermined tension to said endless belt in a tension direction; and means for inclining said tension roller in a direction parallel to the tension direction of said predetermined tension, wherein said inclining means comprises a tapered member, which has a tapered side surface, coupled to one end of said tension roller, and a guide member which contacts with said tapered side surface of said tapered member.

7. The fixing device claimed in claim 6, wherein said tension roller has bearings at opposite ends thereof, and said tapered member is located at one of said bearings.

8. The fixing device claimed in claim 7, wherein said drive means comprises a drive roller which contacts with the inner surface of the endless belt.

9. The fixing device claimed in claim 8, further comprising a pair of holders for holding said drive roller, said heating means and said bearings of said tension roller; and tension springs, which push said bearings, for imparting the predetermined tension to said endless belt, said holders including gaps for slidably holding said bearings therein.

10. The fixing device claimed in claim 6, wherein said heating means comprises a heater which contacts with said endless belt, and a pressure roller for pressing said heater via said endless belt.

\* \* \* \* \*